United States Patent
Yoshida et al.

(10) Patent No.: US 9,679,604 B2
(45) Date of Patent: Jun. 13, 2017

(54) PLAYBACK SPEED ADJUSTABLE APPARATUS FOR PLAYBACK OF MOVING PICTURE

(71) Applicant: CASIO COMPUTER CO., LTD., Shibuya-ku, Tokyo (JP)

(72) Inventors: Toshihiko Yoshida, Fussa (JP); Katsunori Tsutsumi, Tachikawa (JP); Hiroyuki Kato, Fussa (JP); Jun Muraki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 179 days.

(21) Appl. No.: 14/274,091

(22) Filed: May 9, 2014

(65) Prior Publication Data

US 2014/0341548 A1    Nov. 20, 2014

(30) Foreign Application Priority Data

May 16, 2013  (JP) ................. 2013-103865

(51) Int. Cl.
*H04N 9/87* (2006.01)
*G11B 27/00* (2006.01)
*G11B 27/10* (2006.01)

(52) U.S. Cl.
CPC ............ *G11B 27/005* (2013.01); *G11B 27/10* (2013.01)

(58) Field of Classification Search
CPC ........ H04N 9/87; G11B 27/00; G11B 27/005; G11B 27/10
USPC ..... 386/344, 211, 343, 348, 350, 352, E922, 386/E533, E552
See application file for complete search history.

(56) References Cited

U.S. PATENT DOCUMENTS

| 5,797,805 A | * | 8/1998 | Lubell | ............... A63B 24/0003 386/E5.002 |
| 6,514,081 B1 | * | 2/2003 | Mengoli | ............ A63B 24/0003 434/252 |
| 6,560,399 B2 | * | 5/2003 | Sato | .................... A63B 24/0006 386/207 |

(Continued)

FOREIGN PATENT DOCUMENTS

| JP | 60256472 A | 12/1985 |
| JP | 10-145724 A | 5/1998 |

(Continued)

OTHER PUBLICATIONS

Japanese Office Action dated Nov. 25, 2014, issued in counterpart Japanese Application No. 2013-103865.

(Continued)

*Primary Examiner* — Thai Tran
*Assistant Examiner* — Nien-Ru Yang
(74) *Attorney, Agent, or Firm* — Holtz, Holtz & Volek PC

(57) ABSTRACT

The present invention provides an apparatus for playback of a moving picture, which compares an action speed of a specific action of an object in a moving picture played back and displayed by a playback unit with an action speed of a separately acquired specific action which is a comparison target, controls a playback speed during the playback of the specific action by the playback unit based on the comparison result, and displays comparison information relating to the comparison result during the playback of the specific action by the playback unit.

22 Claims, 5 Drawing Sheets

(56) References Cited

U.S. PATENT DOCUMENTS

2008/0207347 A1* 8/2008 Rose .................. A63B 69/3614
                                                            473/222
2008/0253735 A1* 10/2008 Kuspa .................. G11B 27/005
                                                            386/343

FOREIGN PATENT DOCUMENTS

| JP | 10-304299 A | 11/1998 |
| JP | 2002-351293 A | 12/2002 |
| JP | 2004260765 A | 9/2004 |
| JP | 2006-230630 A | 9/2006 |
| KR | 1020050079893 A | 8/2005 |

OTHER PUBLICATIONS

Korean Office Action dated Feb. 10, 2015, issued in counterpart Korean Application No. 10-2014-0053669.

Japanese Office Action (and English translation thereof) dated Mar. 3, 2015, issued in counterpart Japanese Application No. 2013-103865.

* cited by examiner

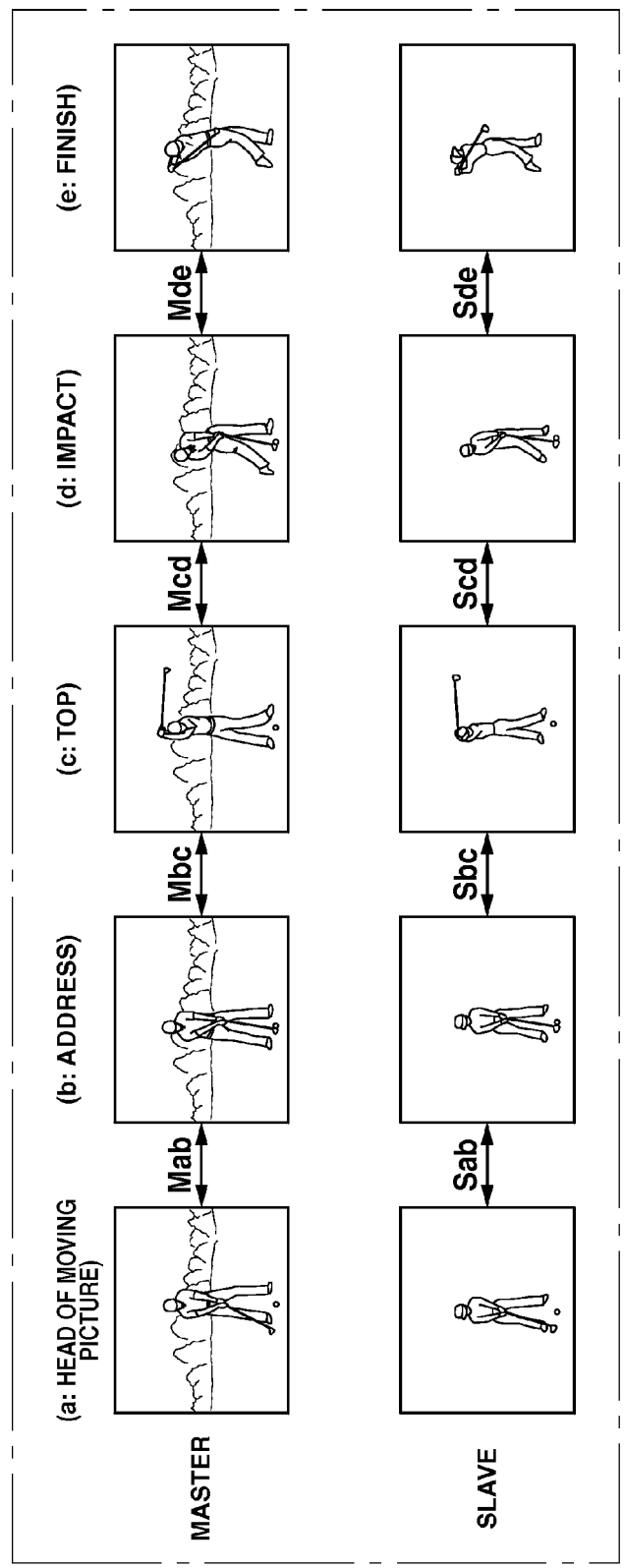

PLAYBACK SPEED ADJUSTABLE APPARATUS FOR PLAYBACK OF MOVING PICTURE

CROSS-REFERENCE TO RELATED APPLICATIONS

This application is based upon and claims the benefit of priority under 35 USC 119 of Japanese Patent Application No. 2013-103865 filed on May 16, 2013, the entire disclosure of which, including the description, claims, drawings, and abstract, is incorporated herein by reference in its entirety.

BACKGROUND OF THE INVENTION

1. Field of the Invention

The present invention relates to a playback speed adjustable apparatus and method for playback of a moving picture, and a (computer readable recording medium having) program thereof.

2. Description of the Related Art

Conventionally, as for a method for evaluating whether a specific action of a specific object is good or not, such as a golf swing of a person, there is known a method capable of comparing a specific action of a specific object with a specific action of a reference object to evaluate the specific action of the specific object, for example, by playing a moving picture of an ideal golf swing of a professional golf player and a moving picture of a golf swing of a person who is subject to evaluation, simultaneously. Further, for example, Japanese Patent Application Laid-Open Publication No. 10-304299 discloses a technique for synchronizing playback time of two moving pictures when time taken from start to finish of a specific action is different between the two moving pictures by adjusting playback speed of one of the moving pictures.

According to the technique, a specific action can be easily compared between moving pictures by synchronizing playback time of the specific action between the moving pictures. For example, a difference between golf swing of a professional player and a user can be easily recognized.

SUMMARY OF THE INVENTION

In view of the above, an object of the present invention is to provide an apparatus, a method and a program (or a recording medium for recording a program) for playback of a moving picture which can compare a specific action of a specific object with another specific action which is a comparison target (or a reference) in moving pictures to identify differences in detail.

According to a first aspect of the present invention, there is provided an apparatus for playback of a moving picture comprising a playback unit for playing back and displaying a moving picture in which a specific action of an object is photographed, an acquisition unit for acquiring information on a target speed of the specific action which is a comparison target to be compared with an action speed of the specific action of the object, a comparison unit for comparing an action speed of the specific action of the object in the moving picture played back and displayed by the playback unit with the target speed of the specific action indicated by the information acquired by the acquisition unit, and a display control unit for controlling the playback unit to display comparison information relating to result of the comparison by the comparison unit while the specific action is played back by the playback unit.

According to a second aspect of the present invention, there is provided a method for playback of a moving picture, comprising playing back and displaying a moving picture in which a specific action of an object is photographed, acquiring information on a target speed of the specific action which is a comparison target to be compared with an action speed of the specific action of the object, comparing the action speed of the specific action of the object in the moving picture with the target speed of the specific action indicated by the information, and displaying comparison information relating to result of the comparison while the specific action of the object in the moving picture is played back.

According to a third aspect of the present invention, there is provided a computer-readable recording medium for recording a program that is executable by a computer included in an apparatus for playback of a moving picture, the program controlling the computer to function as a playback unit for playing back and displaying a moving picture in which a specific action of an object is photographed, an acquisition unit for acquiring information on a target speed of the specific action which is a comparison target to be compared with an action speed of the specific action of the object, a comparison unit for comparing the action speed of the specific action of the object in the moving picture played back and displayed by the playback unit with the target speed of the specific action indicated by the information acquired by the acquisition unit, and a display control unit for controlling the playback unit to display comparison information relating to result of the comparison by the comparison unit while the specific action is played back by the playback unit.

BRIEF DESCRIPTION OF THE DRAWINGS

The present invention will more sufficiently be understood by the following detailed description and the accompanying drawings, which are, however, exclusively for explanation and do not limit the scope of the present invention.

Here:

FIG. 4 shows feature points in moving pictures of a master side and a slave side.

DETAILED DESCRIPTION OF THE PREFERRED EMBODIMENT

Figure 1:
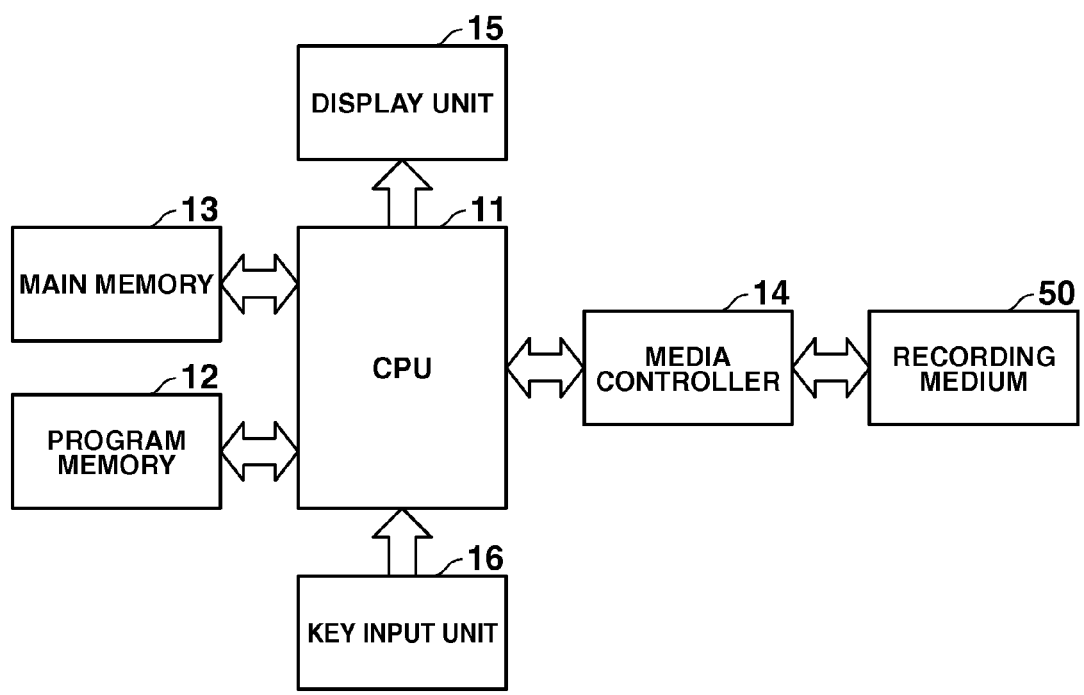
FIG. 1 is a block diagram showing an apparatus for playback of a moving picture according to the present invention.

Hereinafter, embodiments of the present invention will be described. FIG. 1 is a block diagram illustrating main components of an electrical configuration of an apparatus for playback of a moving picture according to an embodiment of the present invention. Specifically, the apparatus for playback of a moving picture 1 is realized by, for example, a digital camera, a smart phone, a personal computer, or the like.

The apparatus for playback of a moving picture 1 includes a CPU (Central Processing Unit) 11 for controlling the entire apparatus, a program memory 12, a main memory 13, a media controller 14, a display unit 15, a key input unit 16.

The program memory 12 is, for example, a non-volatile recording medium having a built-in flash memory. The program memory 12 stores various programs and various data which are required for the CPU 11 to control the apparatus for playback of a moving picture 1. The various programs include a program for controlling the CPU 11 to perform a process for simultaneously playing back two moving pictures which will be described later.

The main memory 13 is, for example, a random accessible volatile recording medium having a DRAM (dynamic random-access memory), and serves as a work memory used when a program is executed by the CPU 11. In other words, the memory 13 records therein various data such as a program read out from the program memory 12 by the CPU 11, a data for displaying a moving picture, and the like.

The media controller 14 is an input/output interface for controlling an input/output between the CPU 11 and a recording medium 50 detachably mounted at a memory card slot installed at a main body (not shown) of the apparatus for playback of a moving picture 1.

The storage medium 50 is, for example, a non-volatile card type recording medium having a flash memory. The recording medium 50 records therein a moving picture data photographed and recorded by, for example, a digital camera, and a moving picture data compressed in, for example, a MPEG (Motion Picture Experts Group) format.

The display unit 15 includes, for example, a color liquid crystal display panel attached with a backlight, and a driving circuit thereof. The display unit 15 displays various information such as image information, text information and the like.

The key input unit 16 includes a power key, other manipulation buttons or the like, and supplies information on user's manipulation of the manipulation buttons or the like to the CPU 11.

Further, in the apparatus for playback of a moving picture 1, a playback process to be described later is performed by the CPU 11 according to the program stored in the program memory 12. Accordingly, two moving pictures that have been individually photographed and recorded are simultaneously played so that specific actions of objects in the two moving pictures can be compared.

Here, according to the present embodiment, the specific action of the object which can be a subject to be compared is a golf swing. In the following description, the recording medium 50 records therein moving picture data of golf swings to be compared, for example, a golf swing of a professional golf player and that of a user, which have been photographed from the front side.

Hereinafter, a sequence of a simultaneous playback process performed by the CPU 11 will be described with reference to the flowchart of FIG. 2.

When the process is started, first, the CPU 11 allows a user to select a moving picture to be played among moving pictures recorded in the recording medium 50 by manipulating a predetermined key. Then, a moving picture is set as a master which is a reference (step S1), and a moving picture is set as a slave (step S2).

Next, the CPU 11 specifies frame positions corresponding to a plurality of predetermined feature points in the golf swings of the moving pictures of the master side and the slave side whose display timings should be synchronized in a synchronized playback process which will be described later (step S3).

Here, the frame position serves as information on a frame number of a frame of a moving picture indicating how many frames there are from the head of the moving picture to the frame.

Further, the moving picture of the master side and the moving picture of the slave side are photographed at the same frame rate (frame interval). The frame rate (frame interval) during the photographing operation is constant from the start to the end of the photographing.

In this case, the frame position serves as information indicating a frame number of each of the frames as well as information indicating an elapsed time from the head of the moving picture to the photographing time of the frame (by setting the frame interval as a time unit).

Therefore, although the frame number is used as a frame position in the following description, the elapsed time may also be used instead of the frame number.

A plurality of feature points specified by the CPU 11 indicate moments of an address in a golf swing, a top of a backswing, an impact and a finish. FIG. 4 shows the feature points of the head a of the moving picture of the master side (lower side in the drawing) and the moving picture of the slave side (upper side in the drawing), the address b, the top of the back swing c, the impact d and the finish e which are specified by the process of the step S3, and also shows frame images corresponding to the feature points.

In the process of the step S3, the CPU 11 detects, for example, a ball or a head of a club from the respective frame images of the moving pictures by a known image processing technique and specifies the frame positions (frame numbers) corresponding to the feature points based on the information such as a positional relationship between the head and the ball, motion vectors indicating a trajectory and a movement direction of the head of the club, or the like.

Moreover, the CPU 11 records in the main memory 13 the frame positions fb to fe of the feature points specified in the respective moving pictures of the master side and the slave side (step S4).

Next, the CPU 11 allows a user to select one of "general playback" and "synchronized playback" as a way of playback of the moving pictures of the master side and the slave side. The "general playback" is a way of playing back both of the moving pictures simultaneously at the same frame rates when photographing the moving pictures. Further, the "synchronized playback" is a way of playing back the moving picture of the master side at a frame rate which is the same as that when photographing the master side moving picture and, at the same time, playing back the moving picture of the slave side by controlling a frame rate such that the display timings of the feature points b to e of the two moving pictures are synchronized.

When "general playback" is selected by the user (step S5: YES), the CPU 11 performs general playback of both of the moving pictures (step S6). In other words, both of the moving pictures are played back simultaneously while each of the moving pictures is played back at the same frame rate as when photographing it as described above (general playback) and displayed on the same screen of the display unit 15.

Figure 5A:
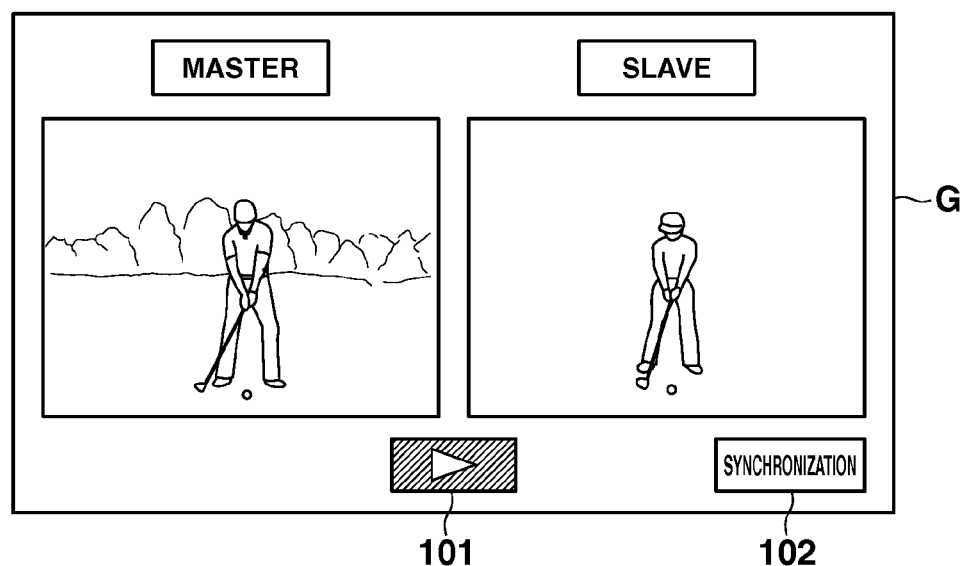
FIG. 5A illustrates an exemplary display of two moving pictures during general playback.

FIG. 5A illustrates a display screen G of the display unit 15 immediately after "general playback" is selected by the user. In the process of the step S6, both of the moving pictures are displayed in the right and the left sides of the display screen G where the master and the slave are clearly marked respectively.

Further, in the process of the step S6, the CPU 11 displays on the display screen G a playback mark 101 indicating "general playback" and a synchronization mark 102 indicating "synchronized playback" and, at the same time, displays that the general playback is being carried out by inversely displaying the playback mark 101 during the playback of both of the moving pictures.

On the other hand, when "synchronized playback" is selected by the user (step S5: NO, step S7: YES), the CPU 11 immediately performs a synchronized playback process shown in FIG. 3 which will be described later (step S8). In other words, as described above, the moving picture of the master side is played back at the same frame rate same as when photographing it, while the moving picture of the slave side is simultaneously played by controlling a frame rate such that the display timings of the feature points b to e are synchronized.

Figure 5B:
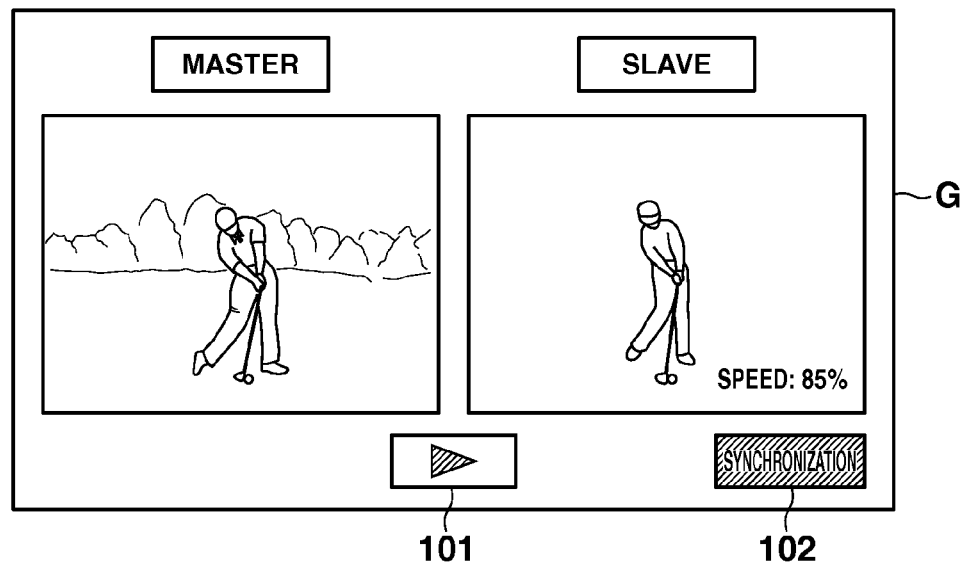
FIG. 5B illustrates an exemplary display of two moving pictures during synchronized playback.

FIG. 5B illustrates the display screen G of the display unit 15 in the case where the "synchronized playback" is selected by the user. In the process of the step S8, the CPU 11 also displays both of the moving pictures in the right and the left sides of the display screen G where the master and the slave are clearly marked respectively.

Further, in the process of the step S8, the CPU 11 displays on the display screen G the playback mark 101 indicating "general playback" and the synchronization mark 102 indicating "synchronized playback" and, at the same time, displays that the synchronized playback is being carried out by inversely displaying the synchronization mark 102 during the playback of both of the moving pictures.

Hereinafter, the synchronized playback process performed by the CPU 11 in the step S8 will be described in detail with reference to FIG. 3. In the synchronized playback process, first, the CPU 11 sets head frame positions mfa and sfa of the respective moving pictures as frame positions Mfpos and Sfpos of the moving pictures of the master side and the slave side which will be played back (step S11), and displays on the display unit 15 a screen on which images corresponding to the respective set frame positions are displayed side by side (step S12).

Next, the CPU 11 operates the timer to immediately start to count time Mt for determining a display timing of each frame of the moving picture of the master side and time St for determining a display timing of each frame of the moving picture of the slave side (step S13).

Next, the CPU 11 checks a frame section to which the frame position Mfpos of the moving picture of the master side belongs among a plurality of frame sections corresponding to a plurality of action sections using the head a of the moving picture and the feature points b to e as a starting point and end points, respectively, and acquires a frame interval coefficient Sk for the frame section (steps S14 to S20).

Here, a plurality of frame sections include a first section from a head frame mfa to a frame mfb corresponding to the address b, a second section from the frame mfb to a frame mfc corresponding to the top of the back swing c, a third section from the frame mfc to a frame mfd corresponding to the impact d, and a fourth section from the frame mfd to a frame mfe corresponding to the finish e.

Further, the frame interval coefficient Sk is a coefficient for determining a frame interval of the moving picture of the slave side and indicates a ratio of the number of frames of the moving picture of the slave side to the number of frames of the moving picture of the master side in each frame section.

Further, as shown in FIG. 4, the CPU 11 acquires the frame interval coefficient Sk by setting the number of frames in the first to the fourth frame sections of the moving picture of the slave side to Sab, Sbc, Scd, and Sde, respectively, and the number of frames in the first to the fourth section of the moving picture of the master side to Mab, Mbc, Mcd and Mde, respectively.

In other words, when the frame position Mfpos of the master side belongs to the first frame section (the section to the frame position mfb corresponding to the address b) (step S14: YES), the CPU 11 calculates (compares) a golf swing speed ratio Mab/Sab in the corresponding frame section between a speed of a golfer's golf swing photographed in the moving picture of the master side and a speed of a golfer's golf swing photographed in the moving picture of the slave side, and acquires the calculated speed ratio (Mab/Sab) of the golf swing as the frame interval coefficient Sk (step S15).

In the same manner, when the frame position Mfpos of the master side belongs to the second frame section (the section from the frame mfb corresponding to the address b to the frame position mfc corresponding to the top of the back swing c) (step S16: YES), the CPU 11 calculates (compares) a golf swing speed ratio Mbc/Sbc in the corresponding frame section and acquires the calculated golf swing speed ratio (Mbc/Sbc) as the frame interval coefficient (step S17).

Further, when the frame position Mfpos of the master side belongs to the third frame section (the section from the frame position mfc corresponding to the top of the backswing c to the frame position mfd corresponding to the impact d) (step S18: YES), the CPU 11 calculates (compares) a golf swing speed ratio Mcd/Scd in the corresponding frame section and acquires the calculated golf swing speed ratio (Mcd/Scd) as the frame interval coefficient (step S19).

Further, when the frame position Mfpos of the master side belongs to the fourth frame section (the section from the frame position mfd corresponding to the impact d to the frame position mfe corresponding to the finish e) (step S18: NO), the CPU 11 calculates (compares) a golf swing speed ratio Mde/Sde in the corresponding frame section and acquires the calculated golf swing speed ratio (Mde/Sde) as the frame interval coefficient (step S20).

Next, the CPU 11 acquires a frame interval time Sf in each of the frame sections of the moving picture of the slave side by multiplying the frame interval coefficient Sk acquired by any one of the processes of the steps S15, S17, S19 and S20 by the frame interval time Mf corresponding to the frame rate in the photographing operation of the moving picture of the master side (step S21). The frame interval time Sf is information necessary to change and set a playback speed (frame rate) during the playback of the moving picture of the slave side such that the golf swing speed of the golfer photographed in the moving picture of the slave side becomes identical to that photographed in the moving picture of the master side during playback periods of the moving pictures corresponding to the respective frame sections.

According to the present embodiment, the playback speed is changed by changing a frame rate for the playback of the moving picture (a speed of the golf swing is changed). However, instead of changing a frame rate, only a playback speed of a moving picture may be changed while maintaining the frame rate by picking out or interpolating frames.

In other words, in the above-described process, the golf swing speed of the golfer photographed in the moving picture of the master side and the golf swing speed of the golfer photographed in the moving picture of the slave side are compared in each of the frame sections. Next, the playback speed during the playback of the moving picture of the slave side is changed based on the comparison result such that the golf swing speed of the golfer photographed in the moving picture of the slave side becomes identical to the golf swing speed of the golfer photographed in the moving picture of the master side.

The present embodiment has been described on the assumption that the moving picture of the master side and the moving picture of the slave side are photographed at the same frame rate (frame interval). However, when the moving picture of the master side and the moving picture of the slave side are photographed at different frame rates (frame intervals), multiplication of the frame intervals of the respective moving pictures by numerical values indicating the frame positions as the frame numbers may be used, instead of such numerical values, for the above-described various calculations.

Thereafter, the CPU 11 acquires a ratio of the speed of the golf swing of the golfer photographed in the moving picture of the slave side to the speed of the golf swing of the golfer photographed in the moving picture of the master side, i.e., the golf swing speed ratio (100/Sk), and displays, as a percentage, the acquired golf swing speed ratio on the moving picture of the slave side which is being played on the display unit 15 (step S22). FIG. 5B shows an example in which the slave speed ratio is about 85%.

In the present embodiment, the speed ratio of the golf swing is acquired and displayed. However, instead of acquiring and displaying the speed ratio of the golf swing, it is possible to acquire a ratio of the playback speed of the moving picture of the slave side to the playback speed of the moving picture of the master side, i.e., a ratio of a slave speed (100/Sf) to a general playback speed, and display, as a percentage, the acquired slave speed ratio on the moving picture of the slave side which is being played on the display unit 15.

In other words, in the above-described process, the speed of the golf swing of the golfer photographed in the moving picture of the master side and the speed of the golf swing of the golfer photographed in the moving picture of the slave side are compared during the playback of the moving pictures corresponding to the respective frame sections, and the comparison information on the comparison result is displayed.

Further, when a count time Mt of the timer of the master side becomes equal to a frame interval time Mf in accordance with the frame rate in the photographing operation (step S23: YES) and the current frame position Mfpos is not the frame position mfe corresponding to the finish e (step S24: NO), the CPU 11 performs increment of the frame position Mfpos (step S25), displays a next frame screen of the moving picture of the master side (step S26), and then restarts the timer of the master side (step S27).

Next, the CPU 11 returns to the process of the step S14 and repeats the above-described processes until the frame position Mfpos becomes the frame position mfe corresponding to the finish e (step S24: NO). As a consequence, the moving picture of the master side is played to the frame position mfe corresponding to the finish e at the same frame rate as that in the photographing operation.

In the meantime, if the frame section to which the playback frame of the master side belongs is not changed, the slave speed ratio displayed in the moving picture of the slave side in the step S22 is maintained at a constant level. Further, if the relative speed of the object in the moving picture of the slave side with respect to the action speed of the object in the moving picture of the master side in the corresponding frame section is changed as the frame section is changed to a next frame section, the change is reflected in the slave speed ratio displayed in the moving picture of the slave side.

Meanwhile, as described above, the CPU 11 plays the moving picture of the slave side by the following processes while the moving picture of the master side is being played at the same frame rate same as that in the photographing operation.

When a timer value St of the slave side becomes equal to the frame interval time Sf (step S23: NO, step S28: YES) and the current frame position Sfpos of the slave side is not the frame position sfe corresponding to the finish e (step S29: NO), the CPU 11 performs increment of the frame position sfpos (step S30), displays a next frame screen of the moving picture of the slave side (step S31), and then restarts the timer of the slave side (step S32).

Thereafter, the CPU 11 returns to the step S14, and repeats the above-described processes until the frame position Sfpos becomes the frame position sfe corresponding to the finish e (step S29: NO). Accordingly, the moving picture of the slave side is played back up to the frame position sfe corresponding to the finish e.

Moreover, in the meantime, the display timing of each of the feature points up to the finish e of the slave side is synchronized with the display timing of each of the corresponding points of the moving picture of the master side by properly controlling the frame interval time Sf of the slave side, i.e., the frame rate, in each of the first to the fourth frame sections by the processes of the steps S14 to S20.

In addition, the CPU 11 performs the following processes in order to adjust the timing during the process. The CPU 11 plays the moving picture of the master side to the frame position mfe corresponding to the finish e (step S24: YES). Then, if the frame position Sfpos of the moving picture of the slave side is not the frame position sfe corresponding to the finish e (step S33: NO), the process returns to the step S14 and the above-described processes are carried out.

In the same manner, the CPU 11 plays the moving picture of the slave side up to the frame position sfe corresponding to the finish e (step S29: YES). Next, if the frame position Mfpos of the moving picture of the master side is not the frame position fe corresponding to the finish e (step S34: NO), the process returns to the step S14 and the above-described processes are carried out.

Further, the CPU 11 completes the synchronized playback process when the playback (display) of the moving pictures of the master side and the slave side up to the frame position fe corresponding to the finish e is completed (step S33: YES).

Accordingly, the moving pictures of the master side and the slave side are simultaneously displayed in a state where the display timings of a plurality of feature points b to e in the golf swing are synchronized. Therefore, a user can easily compare his/her own golf swing with a golf swing of a professional golf player, for example.

Figure 2:
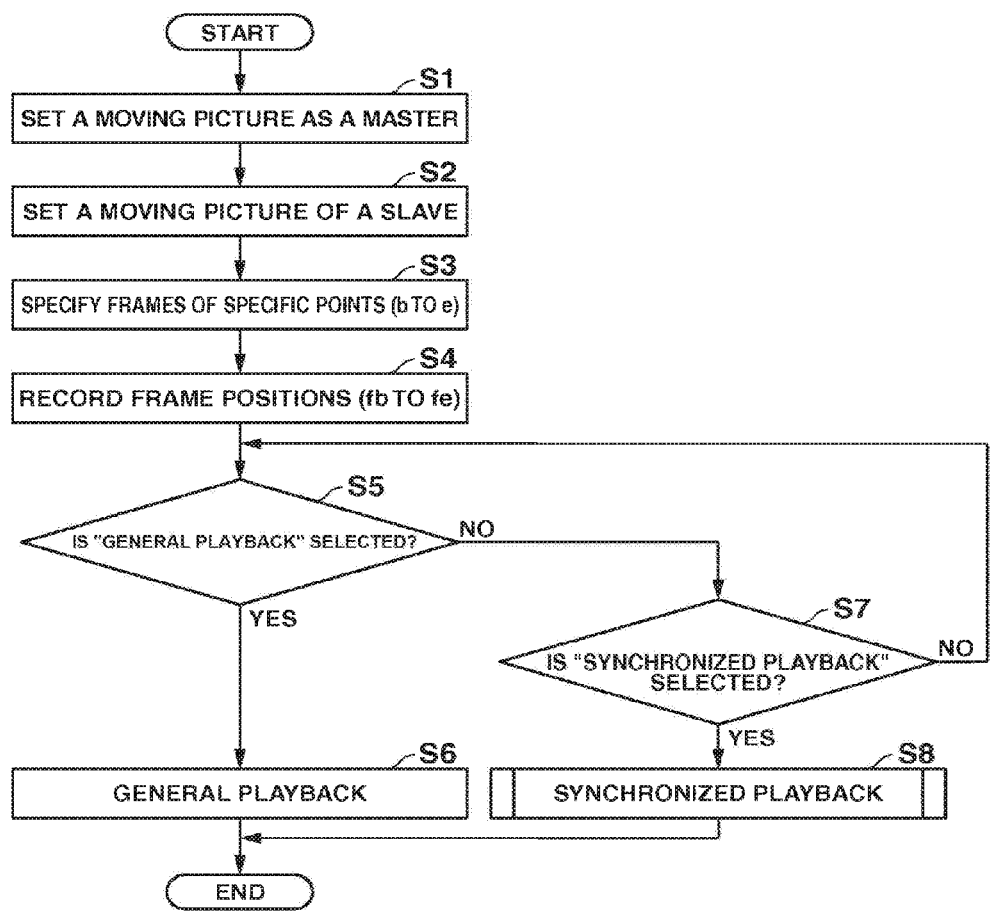
FIG. 2 is a flowchart showing a playback process.

Next, the CPU 11 returns to the processes illustrated in FIG. 2 and completes the simultaneous playback process when the playback of the moving pictures of the master side and the slave side by the method selected from "general playback" and "synchronized playback" is completed.

As described above, in the present embodiment, when "synchronized playback" is selected by the user, the comparison information (slave speed ratio) on the result of comparison between the speed of the golf swing of the golfer photographed in the moving picture of the master side and the speed of the golf swing of the golfer in the photographed in the moving picture of the slave side is displayed on the moving picture of the slave side during the playback of the moving pictures of the master side and the slave side.

Therefore, when the user compares his/her own golf swing with the golf swing of the professional golfer, for example, the user can easily recognize differences in the postures and also can recognize differences in the action speed between the golf swings. Accordingly, the golf swings can be compared to recognize further detailed differences between them.

Further, since the action speed of the golf swing in the moving picture of the slave side is controlled in each of a plurality of action sections using the feature points (address, top of the back swing, impact, finish) as the starting point or the end points, differences between the postures in each of the feature points can be further easily recognized.

Further, although the present embodiment has described the case in which the slave speed ratio is displayed on the moving picture of the slave side, it is sufficient to display the slave speed ratio in relation to the moving picture of the slave side. For example, the slave speed ratio may be simply displayed near the moving picture of the slave side.

Moreover, the slave speed ratio is not necessarily displayed as a numerical value, and may be displayed in any other type instead of the numerical value. For example, a bar-shaped gauge that is increased or decreased in accordance with the slave speed ratio, or a gauge similar to a speedometer indicating a slave speed ratio may be displayed instead of the numerical value.

In the above-described synchronized playback process, the information other than the slave speed ratio may be displayed as the comparison information of the present invention as long as it is the comparison information on the result of comparison of the speed of the golf swing photographed in the moving picture of the master side with the speed of the golf swing photographed in the moving picture of the slave side.

For example, when the speed of the golf swing photographed in the moving picture of the slave side is slower than the action speed of the golf swing photographed in the moving picture of the master side, a downward arrow is displayed in a predetermined region of the moving picture of the slave side. On the contrary, when the speed of the golf swing photographed in the moving picture of the slave side is faster than the action speed of the golf swing photographed in the moving picture of the master side, an upward arrow is displayed in the predetermined region of the moving picture of the slave side. Also, the number of arrows may be increased or decreased in accordance with the speed difference between the golf swings. The user can recognize the difference in the action speed between the golf swings of the mater side and the slave side by the display of the arrows.

Further, although the present embodiment has described the case in which the display timings of the feature points b to e in the golf swing are synchronized by properly controlling the playback speed of the moving picture of the slave side in each of the action sections in the golf swing, the following method may also be employed.

In other words, only the display timings of the head a and the finish e, i.e., the display timings of the start point and the end point of the specific action of the object which is the comparison target, may be synchronized while fixing the playback speed of the moving picture of the slave side to a predetermined speed.

Further, when the display timings of a plurality of feature points b to e in the golf swing are synchronized as in the present embodiment, the feature points may be manually set by a user without being automatically set.

Further, the present embodiment has described the case in which the synchronously played two moving pictures are set to the master and the slave and the action speeds of the golf swings in both of the moving pictures are synchronized by controlling the action speed of the golf swing of the slave side.

However, when two moving pictures are synchronously played back, the action speeds of the golf swings in both of the moving pictures may be controlled individually. For example, the action speed of the golf swing in the synchronized playback may be n-times the actual action speed in any one of the moving picture. In other words, the two moving pictures may be slowly played. In that case, the speed ratios that are ratios of the playback speeds of both of the moving pictures during the synchronized playback to the playback speeds thereof during the photographing operation may be individually acquired, and the acquired speed ratios may be displayed on the respective moving pictures.

Further, in case of the synchronized playback of two moving pictures, for example, if the action speed of the golf swing in one or both of the moving pictures is controlled to a speed faster than the actual speed during the photographing operation, the action speed of the golf swing in the synchronized playback can be controlled by selecting the frames of the moving picture at a constant rate.

Further, although the present embodiment has described the case in which two moving pictures are synchronously played, three or more moving pictures may be synchronously played. In that case, during the synchronized playback, the action speed of the golf swing in each of the moving pictures may be synchronized with the action speed of the golf swing in any one of the moving pictures which serves as the reference, or may be controlled to another preset action speed.

Further, although a plurality of action sections using the feature points (address, top of back swing, impact, finish) as the start point and the end points are set in the present embodiment, a plurality of action sections may be set to range over the feature points (so that each of the feature points is positioned between the start point and the end points). As a consequence, the action speed of the golf swing in each of the feature points can be more easily recognized.

Further, in the present embodiment, the playback speed of the moving picture of the master side is fixed, and the playback speed of the moving picture of the slave side is changed so that the action speed of the golf swing of the slave side is changed based on the action speed of the golf swing of the master side. However, instead of determining the master and the slave, the playback speed may be controlled while varying the selection of moving pictures having different playback speeds in each of a plurality of feature points so that an action speed of one golf swing is changed in accordance with a faster (slower) action speed of the other golf swing in each of the feature points.

Further, the playback speeds of the respective moving pictures may be simultaneously changed so that the action speeds of both golf swings are simultaneously changed in accordance with an intermediate speed (average speed) of the action speeds of a plurality of golf swings in each of the feature points.

Further, although the speed is controlled by directly comparing the golf swings of different persons who are real objects photographed in a plurality of moving pictures to be simultaneously played and the comparison information (speed control information) is displayed according to the present embodiment, the following method may also be employed.

For example, a moving picture which is not a subject of the simultaneous playback, in which a golf swing of a person (for example, a professional golfer C) different from persons (for example, amateur golfers A and B) photographed in a plurality of moving pictures which are subjects of the simultaneous playback, is acquired. Next, instead of directly comparing action speeds of the golf swings of the amateur golfers A and B, differences in action speeds of the golf swings of the amateur golfer A and the professional golfer C and differences in action speeds of the golf swings of the amateur golfer B and the professional golfer C are separately compared. A speed control or display of comparison information (speed control information) may be performed by indirectly comparing the difference in the action speeds of the golf swings of the amateur golfers A and B based on the comparison results.

In this case, it is not necessary to simultaneously play the moving picture of the golf swing of the amateur golfer A and the moving picture of the golf swing of the amateur golfer B. In other words, even when the moving pictures are played at different timings, if the two moving pictures are compared with the golf swing of the single professional golfer C, the golf swing of the amateur golfer A and the golf swing of the amateur golfer B can be indirectly compared by comparing the comparison information (speed control information) displayed in each of the moving pictures.

Further, in the above-described case, the information on the action speed of the golf swing of the professional golfer C may be acquired in the form of numerical data without acquiring the moving picture of the golf swing of the professional golfer C. (In this case, the numerical data of the action speed may be a numerical data of an action speed of a desirable swing logically obtained from a virtual golfer, not based on a golf swing of a real professional golfer.)

Further, although the present invention has been described mainly with respect to the case in which the specific action of the object which is a comparison target is a golf swing, the present invention may be applied to any case in which the specific action of an object is any of postures in various sports such as a bat swing or a pitching of a baseball, a swing of a tennis racket, or any other action.

While the present invention has been described in detail based on the above-described embodiments, it should be noted that the present invention includes all of the embodiments in the following claims without being limited to the above detailed description.

Figure 3:
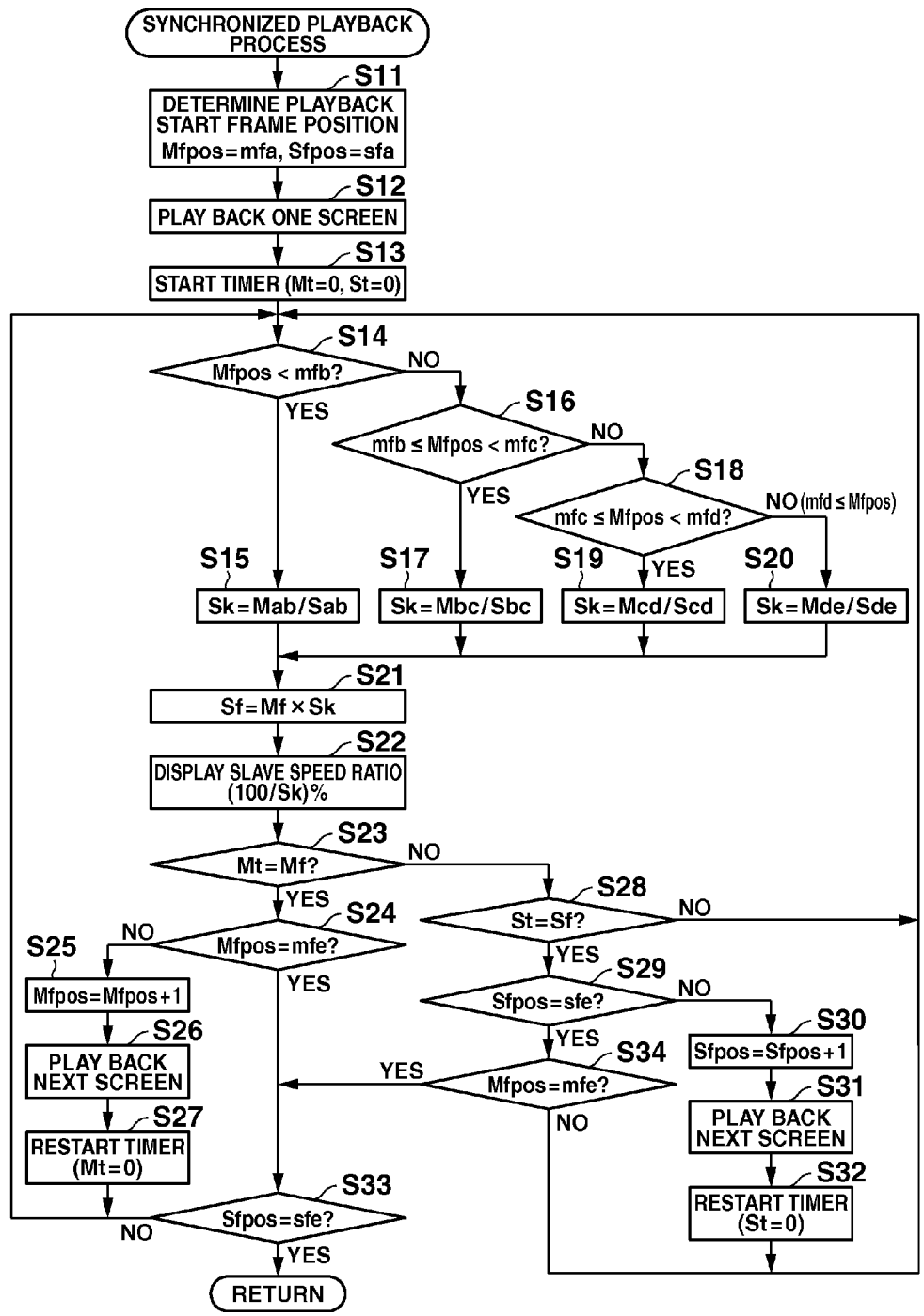
FIG. 3 is a flowchart showing a synchronized playback process.

[FIG. 1]
  12 program memory
  13 main memory
  14 media controller
  15 display unit
  16 key input unit
  50 recording medium
[FIG. 2]
  Start
  S1 Set a moving picture as a master
  S2 Set a moving picture of a slave
  S3 Specify frames of specific points (b to e)
  S4 Record frame positions (fb to fe)
  S5 Is "playback" selected? YES NO
  S6 General playback
  S7 Is "synchronized playback" selected? YES NO
  S8 Synchronized playback
  End
[FIG. 3]
  Synchronized playback process
  S11 Determine playback start frame position. Mfpos=mfa, Sfpos=sfa
  S12 Play back one screen
  S13 Start timer (Mt=0, St=0)
  S14 Mfpos<mfb? YES NO
  S15 Sk=Mab/Sab
  S16 mfb≤Mfpos<mfc? YES NO
  S17 Sk=Mbc/Sbc
  S18 mfc≤Mfpos<mfd? YES NO (mfd≤Mfpos)
  S19 Sk=Mcd/Scd
  S20 Sk=Mde/Sde
  S21 Sf=Mf×Sk
  S22 Display slave speed ratio (100/Sk) %
  S23 Mt=Mf? YES NO
  S24 Mfpos=mfe? YES NO
  S25 Mfpos=Mfpos+1
  S26 Play back next screen
  S27 Restart timer (Mt=0)
  S28 St=Sf? YES NO
  S29 Sfpos=sfe? YES NO
  S30 Sfpos=Sfpos+1
  S31 Play back next screen
  S32 Restart timer (St=0)
  S33 Sfpos=sfe? YES
  Return
[FIG. 4]
  a: Head of moving picture
  b: Address
  c: Top
  d: Impact
  e: Finish
  Master
  Slave
[FIG. 5A]
  Master Slave
  102 Synchronization
[FIG. 5B]
  Master Slave
  102 Synchronization

What is claimed is:

1. An apparatus for playback of a moving picture comprising:

a memory; and a processor which is configured, under control of instructions stored in the memory, to:

play back and display a plurality of moving pictures simultaneously, a specific action of an object being photographed in each of the plurality of moving pictures;

acquire information on a target speed in each of a plurality of action sections of the specific action which is a comparison target to be compared with an action speed of the specific action of the object;

compare the action speed of the specific action of the object in each of the plurality of moving pictures which are played back and displayed simultaneously with the target speed of the specific action indicated by the acquired information for each of the plurality of action sections;

control a playback speed of each of the plurality of moving pictures during the playback of the specific action to change in each of the plurality of action sections based on a comparison result of the comparison; and display information indicating change in the playback speed of each of the plurality of moving pictures, which is controlled to change in each of the plurality of action sections, simultaneously for the plurality of moving pictures in each action section, and change the displayed information indicating change in the playback speed in accordance with the change of the playback speed, while the playback speed is changing in each of the plurality of action sections during playback of the specific action.

2. The apparatus of claim 1, wherein the processor, under control of the instructions stored in the memory:

acquires information on an action speed in each of the plurality of action sections constituting the specific action, compares the action speed of the specific action of the object in each of the plurality of moving pictures which are played back simultaneously with the target speed of the specific action indicated by the acquired information for each of the plurality of action sections, controls the playback speed during playback and display of each of the plurality of moving pictures in each of the plurality of action sections, based on the comparison result in each of the plurality of action sections, and displays the information indicating the change in the playback speed of each of the plurality of moving pictures, which is controlled to change in each of the plurality of action sections during playback of each of the action sections.

3. The apparatus of claim 1, wherein the processor, under control of the instructions stored in the memory, controls the playback speed during the playback of the moving picture such that the action speed of the specific action of the object in each of the plurality of moving pictures which are played back and displayed simultaneously becomes identical to the target speed of the specific action indicated by the acquired information, based on the comparison result.

4. The apparatus of claim 3, wherein the processor, under control of the instructions stored in the memory, controls playback speeds of the plurality of moving pictures such that an action speed of the specific action of each of the plurality of moving pictures played back simultaneously becomes identical to one another, based on the comparison result.

5. The apparatus of claim 4, wherein the processor, under control of the instructions stored in the memory, acquires information on a target speed of the specific action of an object photographed in one of the plurality of moving pictures which are simultaneously played back, which is the comparison target.

6. The apparatus of claim 4, wherein the processor, under control of the instructions stored in the memory, acquires information on a target speed of the specific action of a real or a virtual object which is not the same as an object photographed in any of the plurality of moving pictures which are simultaneously played back, which is the comparison target; and the processor, under control of the instructions stored in the memory, compares the action speed of the specific action of the object in each of the plurality of moving pictures which are simultaneously played back with the target speed of the specific action of the real or virtual object indicated by the acquired information.

7. The apparatus of claim 1, wherein the processor, under control of the instructions stored in the memory, displays, as the information indicating the change in the playback speed which is controlled to change in each of the plurality of action sections, speed adjustment information indicating a degree of changes in action speed of the specific action in each of the plurality of moving pictures in which an action speed of the specific action during the playback has been changed from that of the specific action during the photographing according to control of the processor, while the specific action is played back.

8. The apparatus of claim 2, wherein the processor, under control of the instructions stored in the memory, controls the playback speed during the playback of the plurality of moving pictures for each of the plurality of moving pictures such that the action speed of the specific action in each of the plurality of moving pictures which are simultaneously played back becomes identical to one another in each of the plurality of action sections, based on the comparison result in each of the plurality of action sections.

9. The apparatus of claim 8, wherein the processor, under control of the instructions stored in the memory, determines how to change a playback speed of any of the plurality of moving pictures for each of the plurality of action sections based on the comparison result and changes playback speeds of the plurality of moving pictures for each of the plurality of action sections based on the determination.

10. The apparatus of claim 9, wherein the processor, under control of the instructions stored in the memory, displays speed adjustment information indicating how an action speed of the specific action changes in any of the plurality of moving pictures during playback of each of the plurality of action sections.

11. The apparatus of claim 4, wherein the processor, under control of the instructions stored in the memory:

acquires information on an action speed in each of the plurality of action sections constituting the specific action, compares an action speed of the specific action of the object in each of the plurality of moving pictures which are played back and displayed simultaneously with the target speed of the specific action indicated by the acquired information for each of the plurality of action sections, controls a playback speed of each of the plurality of moving pictures for each of the plurality of action sections based on the comparison result such that an action speed of the specific action of each of the plurality of moving pictures which are played back and displayed becomes identical to one another, and displays the information indicating the change in the playback speed which is controlled to change for each of the plurality of action sections during playback of each of the action sections.

12. The apparatus claim 11, wherein the processor controls, under control of the instructions stored in the memory, for each of the plurality of action sections, a playback speed of each of the plurality of moving pictures when playing back and displaying the plurality of moving pictures simultaneously such that an action speed of the specific action in each of the plurality of moving pictures becomes identical to an action speed of the specific action of one of the plurality of moving pictures when photographing the specific action.

13. The apparatus of claim 11, wherein the processor, under control of the instructions stored in the memory, displays the information indicating the change in the playback speed in relation to a moving picture in which an action speed of the specific action during playback has been changed from that of the specific action during photographing.

14. The apparatus of claim 11, wherein the processor, under control of the instructions stored in the memory, displays, as the information indicating the change in the playback speed, speed adjustment information indicating a degree of changes in action speed of the specific action in a moving picture in which an action speed of the specific action during playback has been changed from that of the specific action during photographing according to control of the processor while playing back each of the action sections.

15. The apparatus of claim 14, wherein the processor, under control of the instructions stored in the memory, displays, as the speed adjustment information for the specific action in each of the plurality of action sections, a numerical value indicating changes in action speed of the specific action.

16. The apparatus of claim 14, wherein the processor, under control of the instructions stored in the memory, displays, as the speed adjustment information for the specific action in each of the plurality of action sections, information showing comparison of playback speeds before and after the change in playback speed, during playback of each of the action sections.

17. The apparatus of claim 2, wherein the specific action is a golf swing, and
the processor, under control of the instructions stored in the memory, controls an action speed of the golf swing in each of the plurality of moving pictures so as to be the same speed in all of a plurality of action sections divided by a plurality of action points in the golf swing.

18. A method for playback of a moving picture on an apparatus for playback of a moving picture which comprises a processor and a display, the method comprising, under control of the processor:
playing back and displaying a plurality of moving pictures simultaneously, a specific action of an object being photographed in each of the plurality of moving pictures;
acquiring information on a target speed in each of a plurality of action sections of the specific action which is a comparison target to be compared with an action speed of the specific action of the object;
comparing the action speed of the specific action of the object in each of the plurality of moving pictures with the target speed of the specific action indicated by the information, for each of the plurality of action sections;
controlling a playback speed of each of the plurality of moving pictures during the playback of the specific action to change in each of the plurality of action sections based on a comparison result of the comparing; and
displaying information indicating change in the playback speed of each of the plurality of moving pictures, which is controlled to change in each of the plurality of action sections, simultaneously for the plurality of moving pictures in each action section, and changing the displayed information indicating change in the playback speed in accordance with the change of the playback speed, while the playback speed is changing in each of the plurality of action sections during playback of the specific action of the object in the moving picture.

19. A non-transitory computer-readable recording medium for recording a program that is executable by a computer included in an apparatus for playback of a moving picture, the program controlling the computer to function as:
playing back and displaying a plurality of moving pictures simultaneously, a specific action of an object being photographed in each of the plurality of moving pictures;
acquiring information on a target speed in each of a plurality of action sections of the specific action which is a comparison target to be compared with an action speed of the specific action of the object;
comparing the action speed of the specific action of the object in each of the plurality of moving picture which are played back and displayed simultaneously with the target speed of the specific action indicated by the acquired information for each of the plurality of actions;
controlling a playback speed of each of the plurality of moving pictures during the playback of the specific action to change in each of the plurality of action sections based on a comparison result of the comparing; and
displaying information indicating change in the playback speed of each of the plurality of moving pictures, which is controlled to change in each of the plurality of action sections, simultaneously for the plurality of moving pictures in each action section, and changing the displayed information indicating change in the playback speed in accordance with the change of the playback speed, while the playback speed is changing in each of the plurality of action sections during playback of the specific action.

20. An apparatus for playback of a moving picture comprising:
a memory; and
a processor which is configured, under control of instructions stored in the memory, to:
play back and display a plurality of moving pictures simultaneously, a specific action of an object being photographed in each of the plurality of moving pictures;
compare an action speed of the specific action of the object in each of the plurality of moving pictures which are played back and displayed simultaneously for each of a plurality of action sections of the specific action;
control a playback speed of each of the plurality of moving pictures during the playback of the specific action so as to change the playback speeds of the plurality of moving pictures simultaneously in accordance with an intermediate speed of the action speeds of the specific action photographed in the plurality of moving pictures in each of the plurality of action sections based on a comparison result of the comparison; and
display information indicating change in the playback speed of each of the plurality of moving pictures, which is controlled to change in each of the plurality of action sections, simultaneously for the plurality of moving pictures in each action section, and change the displayed information indicating change in the playback speed in accordance with the change of the playback speed, while the playback speed is changing in each of the plurality of action sections during playback of the specific action.

21. An apparatus for playback of a moving picture comprising:
a memory; and
a processor which is configured, under control of instructions stored in the memory, to:

play back and display a plurality of moving pictures simultaneously, a specific action of an object being photographed in each of the plurality of moving pictures;

compare an action speed of the specific action of the object in each of the plurality of moving pictures which are played back and displayed simultaneously for each of a plurality of action sections of the specific action;

control a playback speed of each of the plurality of moving pictures during the playback of the specific action in each of the plurality of action sections based on a comparison result of the comparison while varying selection of one of the plurality of moving pictures as a reference and one or more other moving pictures of which playback speeds are to be changed in each action section; and display information indicating change in the playback speed of each of the plurality of moving pictures, which is controlled to change in each of the plurality of action sections, simultaneously for the plurality of moving pictures in each action section, and change the displayed information indicating change in the playback speed in accordance with the change of the playback speed, while the playback speed is changing in each of the plurality of action sections during playback of the specific action.

22. The apparatus of claim 21, wherein the action speed of the specific action of the moving picture selected as the reference in the action section is faster or slower than those of the one or more other moving pictures, and the processor is configured, under control of the instructions stored in the memory, to control the playback speed of each of the one or more other moving pictures so that the action speed of the specific action in each of the one or more other moving pictures changes in accordance with the action speed of the specific action in the reference.

* * * * *